US012561853B2

(12) United States Patent
Chapman

(10) Patent No.: US 12,561,853 B2
(45) Date of Patent: Feb. 24, 2026

(54) DIGITAL (ON SCREEN) COLOR CHANGE INK

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 219 days.

(21) Appl. No.: 18/239,069

(22) Filed: Aug. 28, 2023

(65) Prior Publication Data

US 2025/0078338 A1     Mar. 6, 2025

(51) Int. Cl.
| | |
|---|---|
| *G06T 11/00* | (2006.01) |
| *B41M 3/14* | (2006.01) |
| *B44F 1/10* | (2006.01) |
| *H04N 1/58* | (2006.01) |
| *H04N 1/60* | (2006.01) |

(52) U.S. Cl.
CPC .................................. *G06T 11/001* (2013.01)

(58) Field of Classification Search
CPC .. B44F 1/10; B44F 1/02; B41M 3/148; B42D 25/373; B42D 25/29; B42D 25/351; B42D 2035/24; B42D 15/00; B42D 15/10; Y10T 428/31678; G06V 30/00; G06K 15/1878; G09G 5/02; G09G 5/10; H04N 1/58; H04N 1/6058; G06T 11/001; G06T 5/006–008; G06T 7/38; G06T 2207/10004; G06T 2207/10024
See application file for complete search history.

(56) References Cited

U.S. PATENT DOCUMENTS

| | | | |
|---|---|---|---|
| 8,730,527 | B2 | 5/2014 | Chapman et al. |
| 8,797,602 | B2 | 8/2014 | Chapman et al. |
| 8,892,995 | B2 | 11/2014 | Hoppenot et al. |
| 9,118,870 | B2 | 8/2015 | Chapman |
| 9,237,253 | B2 | 1/2016 | Chapman et al. |
| 9,444,969 | B2 | 9/2016 | Miller et al. |

(Continued)

FOREIGN PATENT DOCUMENTS

EP     2 088 003 B1     3/2011

OTHER PUBLICATIONS

European Patent Application No. 24193123.7-1218, Extended Search Report, Jan. 7, 2025.

(Continued)

*Primary Examiner* — Wesner Sajous
(74) *Attorney, Agent, or Firm* — KPPB LAW; Kermit D. Lopez; Luis M. Ortiz

(57) ABSTRACT

A method, system and printing device for rendering digital color changing inks, can involve configuring a digital ink to appear as one color on a digital screen at one angle and as a different color at a different angle, and rendering the digital ink in a digital document. In an embodiment, a black geometric shape can be created, which can turn off RGB pixels. Single-color lines can be then added to the black geometric shape. The geometric shape can be viewed at different angles to determine one or more working patches. One or more working patches can be then added to the digital document. New Digital color changing inks can be created by taking advantage of the RGB output verses angle curves. The digital inks can appear as one color on a digital screen at one angle and as a different color at a different angle.

17 Claims, 7 Drawing Sheets

(56)                References Cited

U.S. PATENT DOCUMENTS

| | | | |
|---|---|---|---|
| 10,313,556 B1 * | 6/2019 | Chapman | H04N 1/32325 |
| 2007/0281177 A1 * | 12/2007 | Haubrich | B44F 1/10 |
| | | | 427/258 |
| 2012/0188295 A1 * | 7/2012 | Joo | G02F 1/17 |
| | | | 345/690 |
| 2025/0078338 A1 * | 3/2025 | Chapman | G06T 11/001 |

OTHER PUBLICATIONS

"Xerox® Specialty Imaging: Fraud Deterrent Technology"; https://www.xerox.com/en-us/digital-printing/fraud-deterrent-technology; downloaded Jun. 14, 2023.

Marcell M. Williams and Richard Anderson, "Currency Design in the United States and Abroad: Counterfeit Deterrence and Visual", Federal Reserve Bank of St. Louis Review, Sep. / Oct. 2007.

Megan Leonhardt, "About 12 percent of people buying concert tickets get scammed", Sep. 14, 2018.

"Social media users warned over rise in online ticket fraud", The Guardian, Mar. 20, 2016.

Shaurav Lamsal and Aman Shakya, "Counterfeit Paper Banknote Identification Based on Color and Texture", Proceedings of IOE Graduate Conference, 2015, pp. 160-168.

"Fraud-Resistant Effects That Protect Your Most Sensitive Documents", Xerox Corporation 2019.

\* cited by examiner

Copper                                    Green

50

52

54

56

100

101 — Create a black geometric shape which will turn off any RB pixels

102 — Add thin single-color lines

103 — Vary size, line thickness and colors to create a swatch sheet

104 — View at multiple angles to determine working patches

105 — Add working patch(s) to digital element(s)

DIGITAL (ON SCREEN) COLOR CHANGE INK

TECHNICAL FIELD

Embodiments are related to image processing methods, systems and devices. Embodiments further relate to methods, systems and devices for preventing altering, counterfeiting or fraud of digital documents. Embodiments further relate to digital inks.

BACKGROUND

In conventional printing processes that require security measures, specialty imaging can be used to provide security measures and assist in preventing the counterfeiting of printed materials. A pattern color space having specialty imaging characteristics can be used to provide security measures. In addition, in conventional printing processes, a pattern color space has been utilized, in part on variable data, such as printing logos, serial numbers, seat locations, or other types of unique identifying information on printed materials.

In security applications, it may be desirable to add information to a document that can prevent or hinder alterations and counterfeiting. These security elements may conflict with the overall aesthetics of the document. Information regarding specialty imaging including infrared mark text and ultra violet mark text can be found at this webpage: https://www.xerox.com/en-us/digital-printing/secure-printing, which is incorporated herein by reference in its entirety.

Specialty imaging has been used, conventionally, in printed materials to provide fraud protection and anti-counterfeiting measures. Some examples are in prescriptions, contracts, documents, coupons, and tickets. Typically, several specialty imaging techniques may be used at various positions in a document. However, specialty imaging text techniques take up space in the document.

Specialty imaging can be used to protect valuable documents against counterfeiting and fraud with security printing. One such example involves the use of color changing ink. Another specialty imaging technique involves the use of watermarks such as GlossMarks™ (GL) and ultra-violet (UV). These features are expected to appear as a single-color/pattern under one angle/spectrum with a visible watermark under another angle/spectrum. These effects work when printed on media, but not digital/on-screen. Such features can protect, for example, a printed concert ticket, from fraud but not the same ticket on a screened device. Many event tickets may be protected only with a barcode so a copy either digital or printed can let a first user enter and flag any others, even those who may have legitimately purchased the ticket.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for methods, systems and devices for creating digital color changing inks.

It is a further aspect of the embodiments to provide for digital inks that can appear as one color on a digital screen at one angle and appear as a different color at a different angle.

The aforementioned aspects and other objectives and advantages can now be achieved as described herein. In an embodiment, a method for rendering digital color changing inks, can involve operations including configuring at least one digital ink to appear as one color on a digital screen at one angle and as a different color at a different angle, and rendering the at least one digital ink in a digital document.

In an embodiment, configuring the at least one digital ink to appear as one color on the digital screen at one angle and as a different color at a different angle, can further involve: creating a black geometric shape that turns off RGB pixels, and adding single-color lines to the black geometric shape.

In an embodiment, configuring the at least one digital ink to appear as one color on the digital screen at one angle and as a different color at a different angle, can further involve: viewing the geometric shape at different angles to determine at least one working patch, and adding the at least one working patch to the digital document.

An embodiment can further involve varying the size and the line thickness of the single-color lines to create a swatch sheet.

In an embodiment, configuring the at least one digital ink to appear as one color on the digital screen at one angle and as a different color at a different angle, can further involve: creating a black geometric shape that turns off RGB pixels; adding single-color lines to the black geometric shape; viewing the geometric shape at different angles to determine at least one working patch; and adding the at least one working patch to the digital document.

An embodiment can further involve varying the size of the single-color lines to create a swatch sheet.

An embodiment can further involve comprising varying the line thickness of the single-color lines to create a swatch sheet.

An embodiment can also involve varying the size and the line thickness of the single-color lines to create a swatch sheet.

An embodiment can also involve varying the size of a single patch (or possible size and/or shape) color of the single-color line.

In an embodiment, a system for rendering digital color changing inks, can include a processor, and a computer-readable medium containing programming instructions that are configured to cause the processor to: allow at least one digital ink to appear as one color on a digital screen at one angle and as a different color at a different angle; and render the at least one digital ink in a digital document.

In an embodiment of the system, the instructions can be further configured to: create a black geometric shape that turns off RGB pixels and add single-color lines to the black geometric shape.

In an embodiment of the system, the instructions can be further configured to: view the black geometric shape at different angles to determine at least one working patch; and add the at least one working patch to the digital document.

In an embodiment of the system, the instructions can be further configured to vary a size and a line thickness of the single-color lines to create a swatch sheet.

In an embodiment of the system, the instructions can be further configured to: create a black geometric shape that turns off RGB pixels; add single-color lines to the black geometric shape; view the geometric shape at different angles to determine at least one working patch; and add the at least one working patch to the digital document.

In an embodiment of the system, the instructions can be further configured to vary a size of the single-color lines to create a swatch sheet.

In an embodiment of the system, the instructions can be further configured to vary a line thickness of the single-color lines to create a swatch sheet.

In an embodiment of the system, the instructions can be further configured to vary a size and a line thickness of the single-color lines to create a swatch sheet.

In an embodiment, a printing system can include a print device, a processor, and a computer-readable medium containing programming instructions that can be configured to cause the processor to: allow at least one digital ink to appear as one color on a digital screen at one angle and as a different color at a different angle and render the at least one digital ink in a digital document.

In an embodiment of the printing system, the instructions can be further configured to vary a size and a line thickness of the single-color lines to create a swatch sheet.

In an embodiment of the printing system, the instructions can be further configured to: create a black geometric shape that turns off RGB pixels; add single-color lines to the black geometric shape; view the geometric shape at different angles to determine at least one working patch; and add the at least one working patch to the digital document.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

Figure 1:
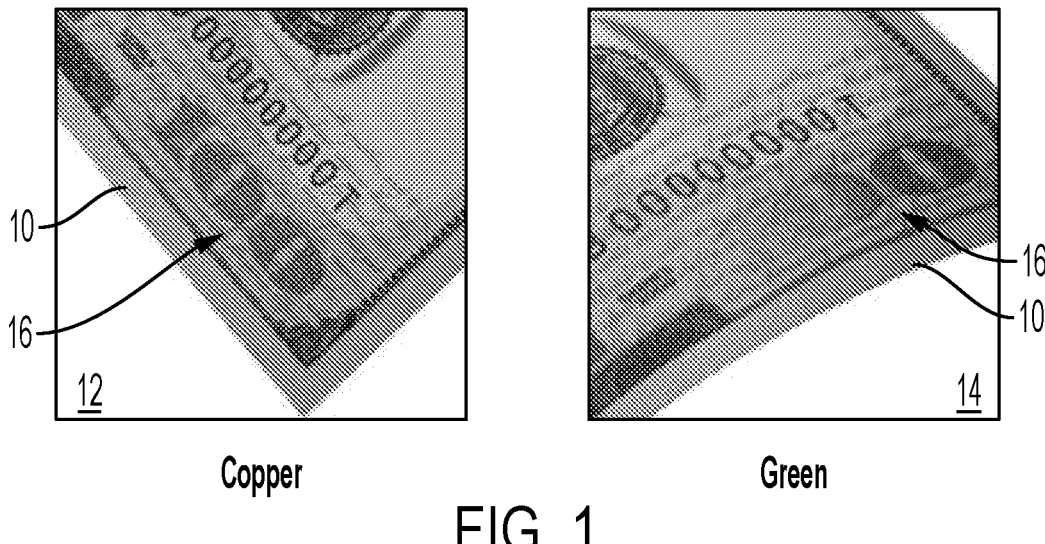
FIG. 1 illustrates images demonstrating an example of color change in currency.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" as utilized herein can relate to physical signals that indicate or include information. An "image," as a pattern of physical light or a collection of data representing the physical light, may include characters, words, and text as well as other features such as graphics.

A "digital image" can be by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term L*a*b (also referred to as Lab or LAB) as utilized herein relates to the CIELAB color space (L*a*b), which is a color space defined by the International Commission on Illumination (CIE). L*a*b It expresses color as three values: L*for perceptual lightness and a*and b*for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

FIG. 1 illustrates images demonstrating an example of color change in currency. In FIG. 1, an image 12 of currency 10 is shown with the color of the number 16 (shown as "100") as a copper color. FIG. 1 also depicts an image 14 of the same currency 10 shown in image 12 but with the same number 16 as expressed in the color green instead of the color copper. That is, the number 16 of the currency 10 undergoes a color change ink with respect to the currency 10.

Figure 2:
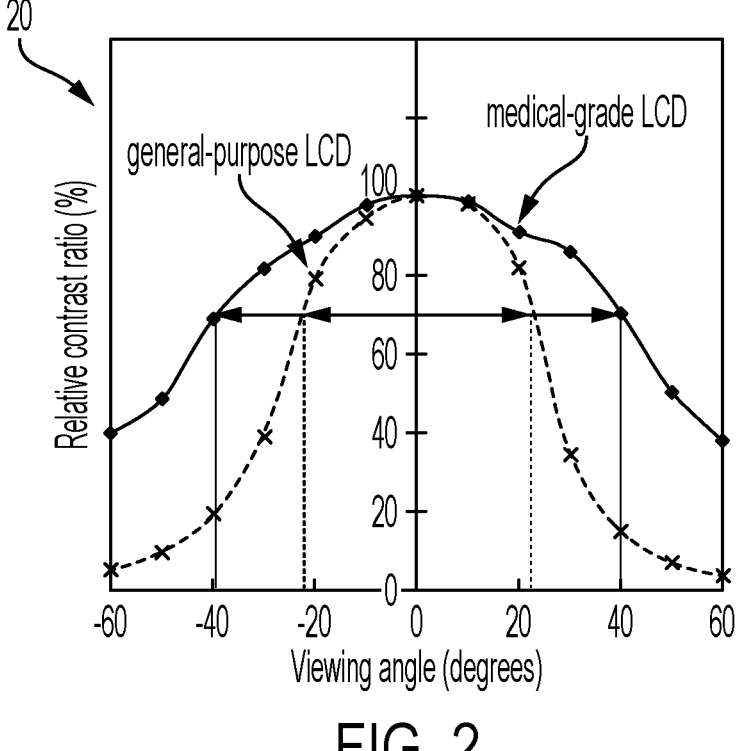
FIG. 2 illustrates a graph depicting data indicative of LCD contrast versus angle.

FIG. 2 illustrates a graph 20 depicting data indicative of LCD (Liquid Crystal Display) contrast versus angle. The graph 20 shown in FIG. 2 plots data concerning a relative contrast ratio (%) along the y-axis versus viewing angles (in degrees) along the y-axis. The dashed curve shown in graph 20 represents general-purpose LCD and the sold line plots medical-grade LCD data.

Note that the acronym LCD represents "Liquid Crystal Display." LCD is a type of display technology used in various devices, including computer monitors, televisions, smartphones, and specialty imaging devices. A fundamental principle of LCD technology involves manipulating light through liquid crystal molecules. These liquid crystals have the ability to change their orientation when subjected to an electric current. The liquid crystals are sandwiched between two layers of glass or plastic, and the orientation of the crystals determines how much light can pass through the display.

When an electric current is applied to specific regions of the LCD, the liquid crystals in those areas align in a way that controls the amount of light passing through, resulting in the formation of images or patterns. This process allows LCDs to display images with excellent clarity and color accuracy.

In the context of watermarks, LCDs can be utilized in specialty imaging devices to embed watermarks into digital images or documents. Watermarks are semi-transparent marks or logos that are overlaid onto an image to indicate ownership, copyright information, authenticity, or other important details. These watermarks are visible but do not interfere with the main content of the image.

Specialty imaging devices equipped with LCD technology can create watermarks by selectively adjusting the liquid crystals' orientation at specific points on the display, thus altering the transparency of those regions. By combining the watermark pattern with the original image, the device produces a new image with the watermark incorporated into it.

LCD-based specialty imaging devices are widely used for security, copyright protection, and authentication purposes. They allow organizations and individuals to add visible or invisible watermarks to their digital content, which can help deter unauthorized use or distribution and establish the content's authenticity.

LCD contrast and viewing angle are essential characteristics that affect how an LCD (Liquid Crystal Display) performs and appears to the viewer. LCD contrast can relate to the difference in luminance (brightness) between the darkest and brightest points on the display. In other words, LCD contrast can measure how distinct the dark and light areas can appear on the screen. A high contrast ratio means that the display can render deeper blacks and brighter whites, resulting in more vivid and visually appealing images.

The contrast ratio is typically expressed as a numerical value, such as 1000:1 or 3000:1, where the first number represents the luminance of the brightest point, and the second number represents the luminance of the darkest point. Higher contrast ratios are generally preferred because they provide better image quality and make the content on the screen stand out more clearly.

The term 'viewing angle' as utilized herein can relate to the maximum angle from which the screen's content can be viewed without experiencing a significant degradation in image quality. In practical terms, the viewing angle may determine how much the viewer can deviate from the center of the screen while still maintaining a clear and undistorted image.

LCD panels may have a limited viewing angle because of the way liquid crystals work. When you view an LCD from an extreme angle, the orientation of the liquid crystals may not be optimal for transmitting light, leading to reduced contrast, color shifting, and even the appearance of darkening or color inversion.

There are two main types of viewing angles associated with LCDs—horizontal view angle and vertical viewing angle. Horizontal Viewing Angle refers to how far to the left or right you can move from the center of the screen before the image quality starts to degrade. Vertical Viewing Angle refers to how far up or down you can move from the center of the screen while maintaining good image quality.

Manufacturers often specify the viewing angles of an LCD in degrees, such as 178°/178°, where the first number represents the horizontal viewing angle, and the second number represents the vertical viewing angle.

Figure 3:
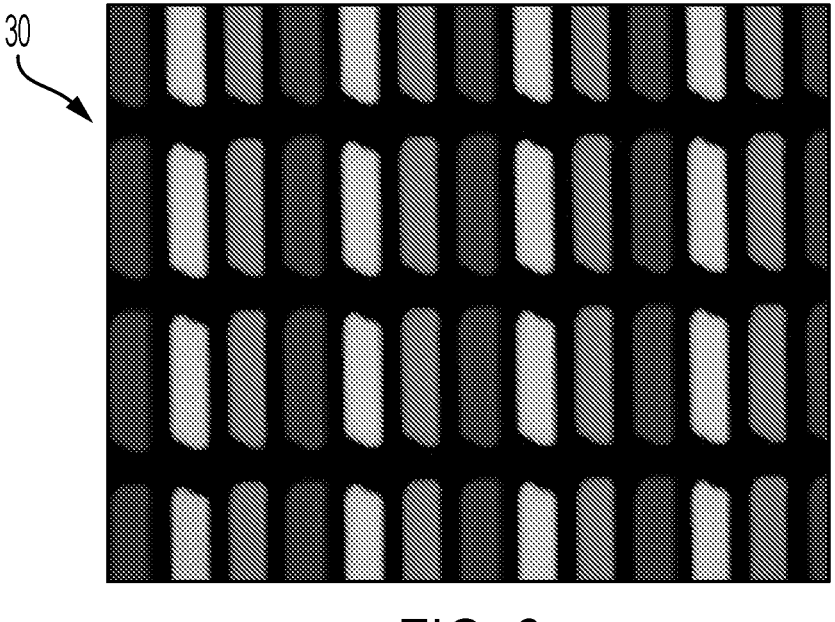
FIG. 3 illustrates an image of an LCD close up.

A wider viewing angle is desirable, especially for larger displays or situations where multiple people need to view the screen simultaneously. In some advanced LCD technologies, like IPS (In-Plane Switching) or OLED (Organic Light Emitting Diode), the viewing angles can be significantly improved compared to older LCD technologies like TN (Twisted Nematic). These advanced technologies offer better color and image consistency even at wider viewing angles. Note that FIG. 3 illustrates an image 30 of an LCD close up.

Note that the term 'swatch' as utilized herein can refer to a device that can be used to define the color, intensity, and other characteristics of a watermark such as, for example, a gloss mark. By choosing specific swatches for the gloss effect, for example, designers can accurately control the shine and highlight intensity. This allows the designer to create a consistent gloss effect across multiple images, ensuring a unified and visually appealing presentation.

Swatches play a crucial role in maintaining consistency and efficiency in the creative process. By defining the visual elements using swatches, designers can easily apply the same attributes to various parts of an image or across different images, saving time and effort while achieving a professional and polished result. Many image editing software applications provide built-in swatch libraries, and designers can also create custom swatches based on their project requirements.

The following generally describes the steps of a methodology for digital (on screen) color change ink, in accordance with an embodiment.

1) Create a black geometric shape which will turn off any RGB pixels
    2) Add thin single-color lines
    3) Vary size, line thickness and colors to create a swatch sheet
    4) View at multiple angles to determine working patches
    5) Add working patch(s) to digital document(s)

Figure 4:
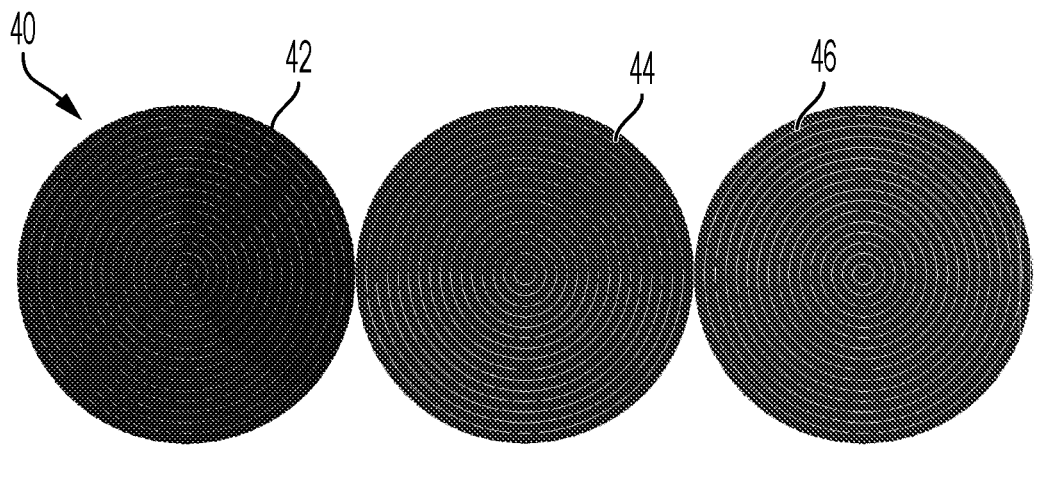
FIG. 4 illustrates samples swatches in accordance with an embodiment.

A black circle can be selected for step 1 to turn all the pixels in the swatch off. Step 2 involves adding thin color circular lines in colors RGB CMY in semi-circles. FIG. 4 illustrates an image 40 depicting an example of 6 swatches in the context of swatches 42, 44, 46, in accordance with an embodiment.

Figure 5:
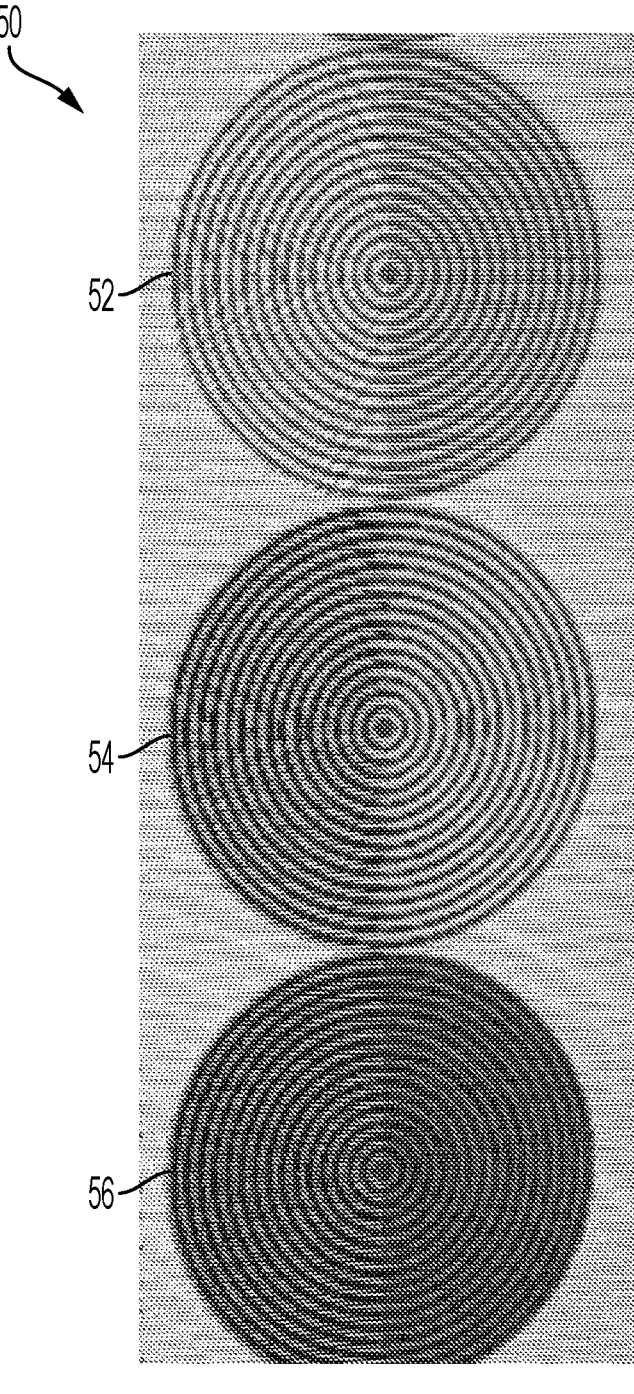
FIG. 5 illustrates a swatch at one angle in accordance with an embodiment.
Figure 6:
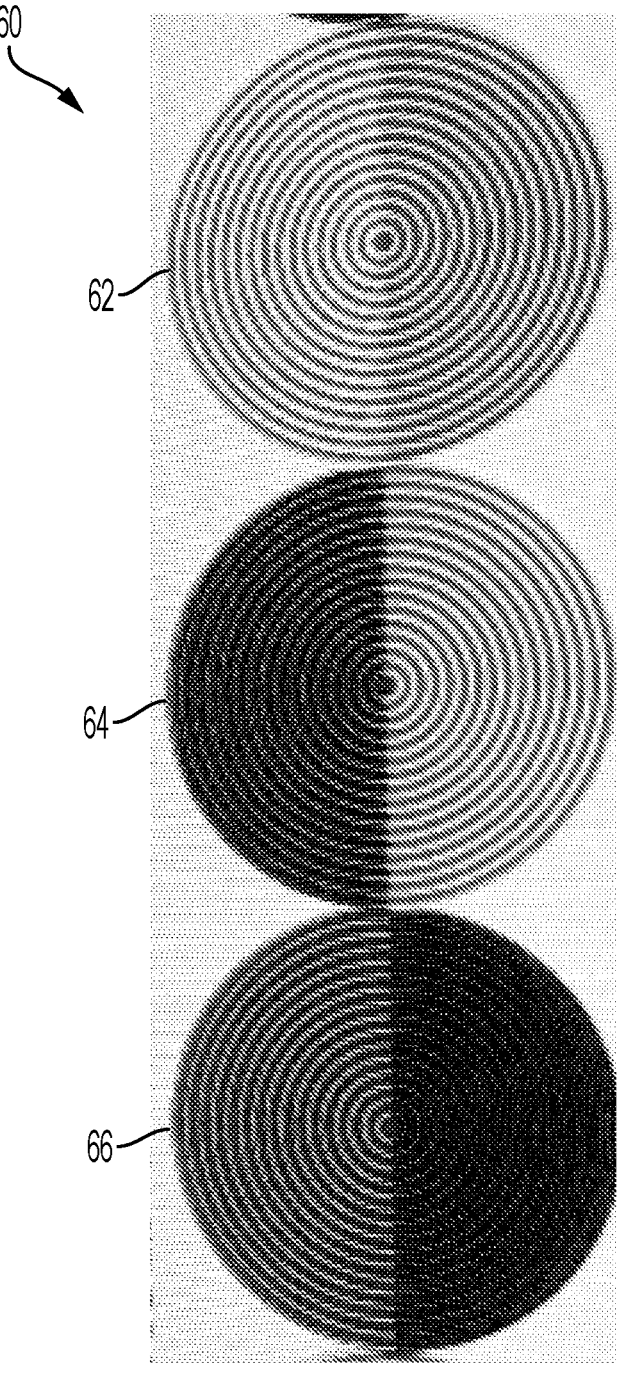
FIG. 6 illustrates the same swatch as shown in FIG. 5 but a different angle, in accordance with an embodiment.

The thin colored lines varied in contrast at different angles between the screen and observer (see FIG. 2). The black circles do not noticeably vary at different angles. The native colors RGB (see FIG. 3) vary more than the nonnative colors CMY. FIGS. 5 and 6 depict the same swatches at two different angels. That is, FIG. 5 illustrates an image 50 of a swatch at one angle as shown by the swatches 52, 54, and 56. FIG. 6 illustrates an image 60 of same swatch as shown in FIG. 5 but a different angle (see swatches 62, 24, 60), in accordance with an embodiment.

Figure 7:
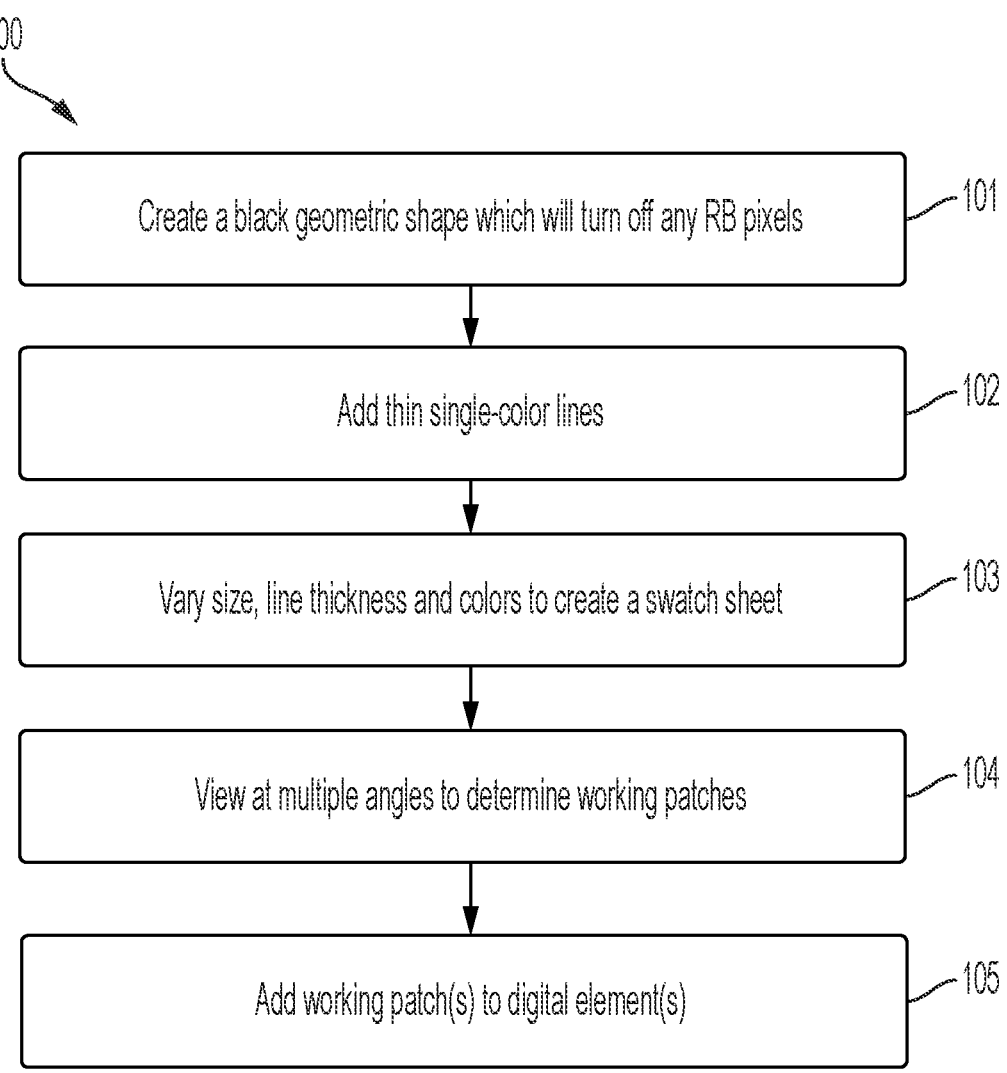
FIG. 7 illustrates a high-level flow chart of operation depicting logical operational steps of a method for rendering digital inks, in accordance with an embodiment.

FIG. 7 illustrates a high-level flow chart of operation depicting logical operational steps of a method 100 for rendering a digital (on screen) color change in accordance with an embodiment. As shown at block 101, a step or operation can be implemented to create a black geometric shape which will turn off any RGB pixels. Next, as shown at block 102, a step or operation can be implemented to add thin single-color lines.

Then, as indicated at block 103, a step or operation can be implemented to vary the size, line thickness, and colors to create a swatch sheet. Thereafter, a step or operation can be implemented as shown at block 104 involving viewing at multiple angles to determine working patches. Then, as, shown at block 105, a step or operation can be implemented to add a working patch(s) to digital document(s). Finally, the digital document may be rendered either on screen and/or by, for example, printing of the document.

Figure 8:
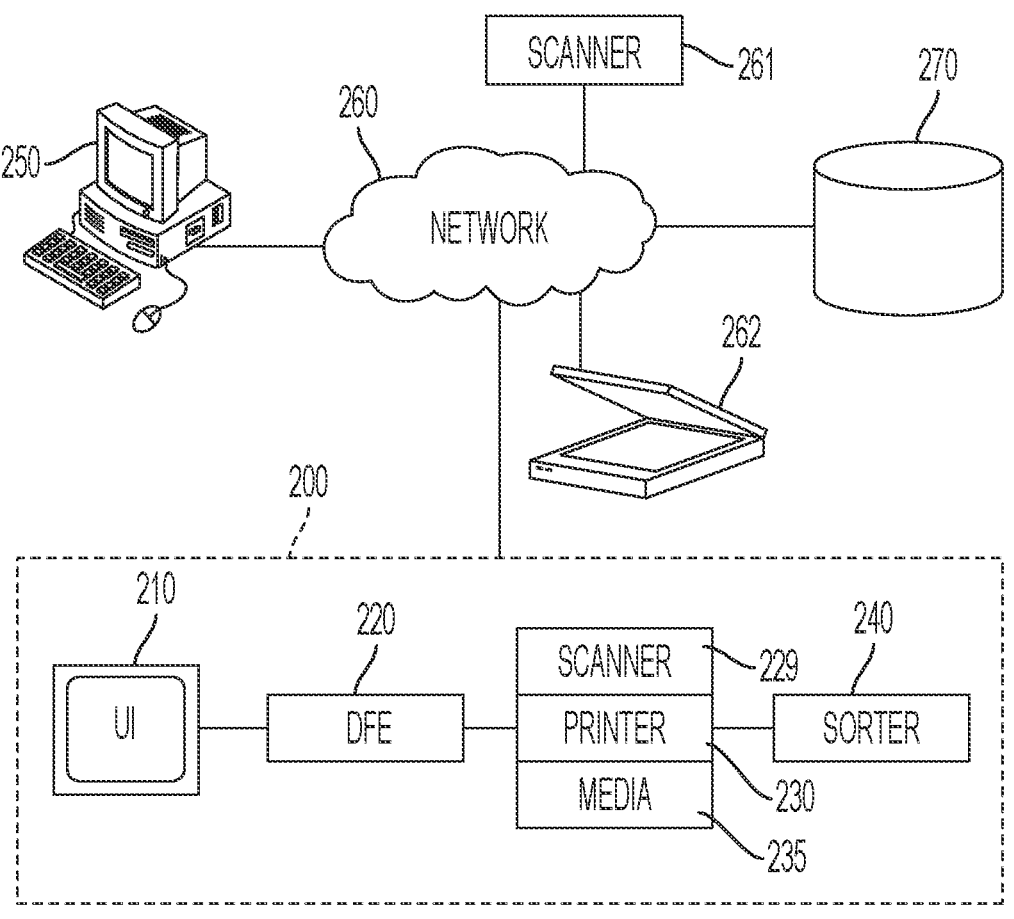
FIG. 8 illustrates a block diagram of a printing system suitable for implementing one or more of the disclosed embodiments.
Figure 9:
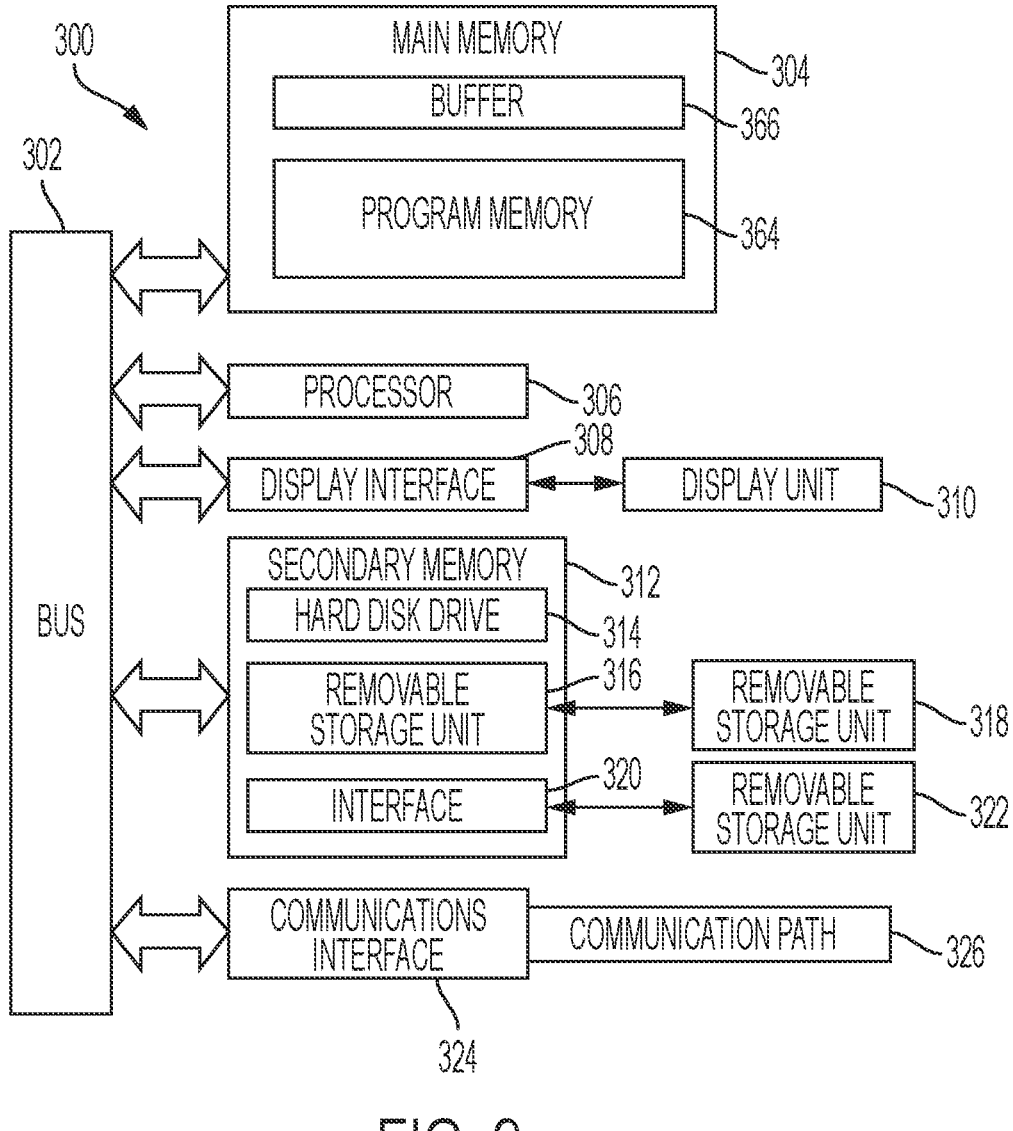
FIG. 9 illustrates a block diagram of a digital front-end controller useful for implementing one or more of the disclosed embodiments.

FIG. 8 illustrates a block diagram of a printing system 200 suitable for implementing one or more of the disclosed embodiments. FIG. 9 illustrates a block diagram of a digital front-end 300 useful for implementing one or more of the disclosed embodiments. The printing system 200 and/or the digital front-end 300 can be used to render (e.g., print) a recording medium (e.g., a document or substrate) with the digital color changing inks discussed herein. In some embodiments, the digital front-end 300 shown in FIG. 9 may be used to implement the digital front-end 220 shown in FIG. 8.

With reference to FIG. 8, the printing system (or image rendering system) 200 can implement rendering operations such as scanning a document via a scanner and printing a document via a printer, wherein the document may be rendered with, for example, the digital color changing inks discussed earlier. The printing system 200 can be used to implement, for example, the method 100 discussed herein with respect to FIG. 7.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may also be implemented as a feed sheet scanner capable of scanning multiple sheets. The scanner may in some cases be incorporated into a multi-function device (MFD), which also may possess printing and photocopying features. The scanner may also be incorporated into, for example, a printing system such as the printing system 200 shown in FIG. 8 For example, the scanner 229 is shown in FIG. 8 as a part of the printing system 200. Alternatively, or in addition to the scanner 229 included as a part of the printing system 200, a scanner 261 and/or a scanner 262 may communicate with the printing system 200 through the network 260.

The terms "printer," "print device," and "printing system" as used herein can be utilized interchangeably to refer to the same rendering device or system and can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

A "print device" or a "printing system" is an electronic device that is capable of receiving commands and/or data, and in response printing characters and/or images on a substrate. Printing devices may include, but are not limited to, network printers, production printers, copiers and other devices using ink or toner, and scanners. A print device may also perform a combination of functions such as printing and scanning, in which case such a device may be considered a multifunction device.

The printing system 200 can include a user interface 210, the digital front-end (DFE) 220, and one or more print engines such as a print engine 230. The print engine 230 may have access to print media 235 of various sizes and in some cases the cost for a print job. In some embodiments, the printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path in some embodiments.

With respect to FIG. 9, an exemplary DFE (Digital Front End) 300 is shown in greater detail. The DFE 300 can include one or more processors, such as processor 306 capable of executing machine executable program instructions. The processor 306 can function as a DFE processor. The DFE shown in FIG. 9 may be utilized as or with the digital front end 220 of the printing system 200 shown in FIG. 8.

Note that the term 'processor' as utilized herein can relate a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., which can store computer software and/or data.

The secondary memory 312 alternatively may include other similar mechanisms for allowing computer programs or other instructions to be loaded into the computer system.

Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 shown in FIG. 9 can include a communications interface 324, which can act as an input and an output interface to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, can enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, some embodiments may be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein. Examples of such instructions include the operations depicted in the various blocks shown in FIG. 7.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 8 and/or the DFE controller 300 shown in FIG. 9. A "module" can perform the various steps, operations or instructions discussed herein, such as the steps or operations discussed herein with respect to FIG. 7 and elsewhere herein.

The method 100 shown in FIG. 7 for example, may be implemented, in part, in a computer program product comprising a module that may be executed by, for example, the DFE controller 220 (or the DFE 300 of FIG. 9). The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 8).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed examples discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventor has realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which a security device (e.g., a watermark) may be rendered.

Based on the foregoing, it can be appreciated that a number of different embodiments are disclosed herein including preferred and alternative embodiments. For example, in a preferred embodiment, a method for rendering digital color changing inks, can involve operations including configuring at least one digital ink to appear as one color on a digital screen at one angle and as a different color at a different angle, and rendering the at least one digital ink in a digital document.

In an embodiment, the step or operation of configuring the at least one digital ink to appear as one color on the digital screen at one angle and as a different color at a different angle, can further involve: creating a black geometric shape that turns off RGB pixels, and adding single-color lines to the black geometric shape.

In an embodiment, the step or operation of configuring the at least one digital ink to appear as one color on the digital screen at one angle and as a different color at a different angle, can further involve: viewing the geometric shape at different angles to determine at least one working patch, and adding the at least one working patch to the digital document.

An embodiment can further involve varying the size and the line thickness of the single-color lines to create a swatch sheet.

In an embodiment, the step or operation of configuring the at least one digital ink to appear as one color on the digital screen at one angle and as a different color at a different angle, can further involve: creating a black geometric shape that turns off RGB pixels; adding single-color lines to the black geometric shape; viewing the geometric shape at different angles to determine at least one working patch; and adding the at least one working patch to the digital document.

An embodiment can further involve varying the size of the single-color lines to create a swatch sheet.

An embodiment can further involve comprising varying the line thickness of the single-color lines to create a swatch sheet.

An embodiment can also involve varying the size and the line thickness of the single-color lines to create a swatch sheet.

An embodiment can also involve varying the size of a single patch (or possible size and/or shape) color of the single-color line.

In an embodiment, a system for rendering digital color changing inks, can include a processor, and a computer-readable medium containing programming instructions that are configured to cause the processor to: allow at least one digital ink to appear as one color on a digital screen at one angle and as a different color at a different angle; and render the at least one digital ink in a digital document.

In an embodiment of the system, the instructions can be further configured to: create a black geometric shape that turns off RGB pixels and add single-color lines to the black geometric shape.

In an embodiment of the system, the instructions can be further configured to: view the black geometric shape with lines (or just a geometric shape) at different angles to determine at least one working patch, and add the at least one working patch to the digital document.

In an embodiment of the system, the instructions can be further configured to vary a size and a line thickness of the single-color lines to create a swatch sheet.

In an embodiment of the system, the instructions can be further configured to: create a black geometric shape that turns off RGB pixels; add single-color lines to the black geometric shape; view the geometric shape at different angles to determine at least one working patch; and add the at least one working patch to the digital document.

In an embodiment of the system, the instructions can be further configured to vary a size of the single-color lines to create a swatch sheet.

In an embodiment of the system, the instructions can be further configured to vary a line thickness of the single-color lines to create a swatch sheet.

In an embodiment of the system, the instructions can be further configured to vary a size and a line thickness of the single-color lines to create a swatch sheet.

In an embodiment, a printing system can include a print device, a processor, and a computer-readable medium containing programming instructions that can be configured to cause the processor to: allow at least one digital ink to appear as one color on a digital screen at one angle and as a different color at a different angle and render the at least one digital ink in a digital document.

In an embodiment of the printing system, the instructions can be further configured to vary a size and a line thickness of the single-color lines to create a swatch sheet.

In an embodiment of the printing system, the instructions can be further configured to: create a black geometric shape that turns off RGB pixels; add single-color lines to the black geometric shape; view the geometric shape at different angles to determine at least one working patch; and add the at least one working patch to the digital document.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering digital color changing inks, comprising:

configuring at least one digital ink to appear as one color on a digital screen at one viewing angle and as a different color at a different viewing angle, wherein configuring the at least one digital ink to appear as one color on the digital screen at one viewing angle and as a different color at a different viewing angle, further comprises:

generating a black geometric shape that causes the underlying display pixels to emit no light or remain inactive;

superimposing thin lines of a single display color onto the black geometric shape; and rendering the at least one digital ink in a digital document.

2. The method of claim 1 wherein configuring the at least one digital ink to appear as one color on the digital screen at one viewing angle and as a different color at a different viewing angle, further comprises:

viewing the black geometric shape at different angles to determine at least one working patch; and adding the at least one working patch to the digital document.

3. The method of claim 2 further comprising varying a size and a line thickness of thin lines of a single display color to create a swatch sheet comprising a collection of test patches or swatches displayed together for evaluating angle-dependent color variation.

4. The method of claim 1 further comprising varying a size of the thin lines of a single display color to create a swatch sheet comprising a collection of test patches or swatches displayed together for evaluating angle-dependent color variation.

5. The method of claim 1 further comprising varying a line thickness of the thin lines of a single display color to create a swatch sheet comprising a collection of test patches or swatches displayed together for evaluating angle-dependent color variation.

6. The method of claim 1 comprising:

varying a size and a line thickness of the thin lines of a single display color to create a swatch sheet comprising a collection of test patches or swatches displayed together for evaluating angle-dependent color variation.

7. A system for rendering digital color changing inks, comprising:

a processor; and a computer-readable medium containing programming instructions that are configured to cause the processor to:

allow at least one digital ink to appear as one color on a digital screen at one viewing angle and as a different color at a different viewing angle;

generate a black geometric shape that causes the underlying display pixels to emit no light or remain inactive;

superimpose thin lines of a single display color onto the black geometric shape; and render the at least one digital ink in a digital document.

8. The system of claim 7 wherein the instructions are further configured to:

view the black geometric shape at different viewing angles to determine at least one working patch; and add the at least one working patch to the digital document.

9. The system of claim 7 wherein the instructions are further configured to vary a size and a line thickness of the thin lines of a single display color to create a swatch sheet comprising a collection of test patches or swatches displayed together for evaluating angle-dependent color variation.

10. The system of claim 7 wherein the instructions are further configured to vary a size of the thin lines of a single display color to create a swatch sheet comprising a collection of test patches or swatches displayed together for evaluating angle-dependent color variation.

11. The system of claim 7 wherein the instructions are further configured to vary a line thickness of the thin lines of a single display color to create a swatch sheet comprising a collection of test patches or swatches displayed together for evaluating angle-dependent color variation.

12. The system of claim 7 wherein the instructions are further configured to vary a size and a line thickness of the thin lines of a single display color to create a swatch sheet comprising a collection of test patches or swatches displayed together for evaluating angle-dependent color variation.

13. A printing system, comprising:

a print device;

a processor; and a computer-readable medium containing programming instructions that are configured to cause the processor to:

allow at least one digital ink to appear as one color on a digital screen at one viewing angle and as a different color at a different viewing angle;

generate a black geometric shape that causes the underlying display pixels to emit no light or remain inactive;

superimpose thin lines of a single display color onto the black geometric shape; view the geometric shape at different viewing angles to determine at least one working patch;

add the at least one working patch to the digital
    document; and render the at least one digital ink in a digital document.

14. The printing system of claim 13 wherein the instructions are further configured to vary a size and a line thickness of the thin lines of a single display color to create a swatch sheet comprising a collection of test patches or swatches displayed together for evaluating angle-dependent color variation.

15. The printing system of claim 13 wherein the instructions are further configured to vary a size of the thin lines of a single display color to create a swatch sheet comprising a collection of test patches or swatches displayed together for evaluating angle-dependent color variation.

16. The printing system of claim 13 wherein the instructions are further configured to vary a line thickness of the thin lines of a single display color to create a swatch sheet comprising a collection of test patches or swatches displayed together for evaluating angle-dependent color variation.

17. The printing system of claim 13 further comprising a DFE (Digital Front End) comprising the processor.

* * * * *